(12) United States Patent
Kang et al.

(10) Patent No.: US 10,741,851 B2
(45) Date of Patent: Aug. 11, 2020

(54) BIPOLAR PLATE-ELECTRODE ASSEMBLY USING THERMOPLASTIC RESIN AND MANUFACTURING METHOD THEREOF

(71) Applicant: H2, INC., Daejeon (KR)

(72) Inventors: Se Goo Kang, Daejeon (KR); Yujong Kim, Daejeon (KR); Kyung Mae Park, Daejeon (KR); Shin Han, Daejeon (KR)

(73) Assignee: H2, INC., Daejeon (KR)

( * ) Notice: Subject to any disclaimer, the term of this patent is extended or adjusted under 35 U.S.C. 154(b) by 17 days.

(21) Appl. No.: 16/308,096

(22) PCT Filed: Nov. 6, 2017

(86) PCT No.: PCT/KR2017/012461
§ 371 (c)(1),
(2) Date: Dec. 7, 2018

(87) PCT Pub. No.: WO2018/105898
PCT Pub. Date: Jun. 14, 2018

(65) Prior Publication Data
US 2019/0173101 A1  Jun. 6, 2019

(30) Foreign Application Priority Data

Dec. 9, 2016 (KR) .................. 10-2016-0167688

(51) Int. Cl.
*H01M 8/0245* (2016.01)
*H01M 8/18* (2006.01)
*H01M 8/0239* (2016.01)
*H01M 8/20* (2006.01)

(52) U.S. Cl.
CPC ....... *H01M 8/0245* (2013.01); *H01M 8/0239* (2013.01); *H01M 8/18* (2013.01); *H01M 8/188* (2013.01); *Y02E 60/528* (2013.01)

(58) Field of Classification Search
None
See application file for complete search history.

(56) References Cited

U.S. PATENT DOCUMENTS

| 4,622,192 A | 11/1986 | Ma et al. | |
|---|---|---|---|
| 6,296,746 B1 | 10/2001 | Broman et al. | |
| 6,656,639 B1 * | 12/2003 | Hagg | H01M 4/02 429/234 |

(Continued)

FOREIGN PATENT DOCUMENTS

| JP | 2002-540570 A | 11/2002 |
|---|---|---|
| JP | 2015-198090 A | 11/2015 |

(Continued)

*Primary Examiner* — Ula C Ruddock
*Assistant Examiner* — Amanda Rosenbaum
(74) *Attorney, Agent, or Firm* — Rabin & Berdo, P.C.

(57) ABSTRACT

Provided is a bipolar plate-electrode assembly used in a redox flow battery stack, in which a bipolar plate (140) is made of a thermoplastic resin, electrodes (170A, 170B) disposed on both sides of the bipolar plate are thermally compressed at a central portion of the bipolar plate so as to be permeated into the bipolar plate, the size of the bipolar plate is larger than that of the electrodes, and fiber mats (150A, 150B) are hot-pressed so as to be permeated in an periphery (141) the bipolar plate which is a larger area than the electrodes.

1 Claim, 6 Drawing Sheets

(56) References Cited

U.S. PATENT DOCUMENTS

2001/0006745 A1* 7/2001 Bronoel .............. H01M 8/0221
                                                          429/414
2004/0202915 A1* 10/2004 Nakaishi ............. H01M 8/0213
                                                          429/469

FOREIGN PATENT DOCUMENTS

KR    10-2001-0106464 A    11/2001
WO    WO 2016-017989 A1    2/2016

* cited by examiner

BIPOLAR PLATE-ELECTRODE ASSEMBLY USING THERMOPLASTIC RESIN AND MANUFACTURING METHOD THEREOF

CROSS-REFERENCE TO RELATED APPLICATIONS

This application claims the priority of Korean Patent Application No. 2016-0167688 filed on Dec. 9, 2016, in the Korean Intellectual Property Office, the disclosure of which is incorporated herein by reference.

BACKGROUND OF THE INVENTION

Field of the Invention

The present invention relates to a bipolar plate-electrode assembly used for a unit cell for a redox flow battery and more particularly, to a bipolar plate-electrode assembly using a thermoplastic resin and a manufacturing method thereof.

Description of the Related Art

A redox flow battery is one of core products closely related to renewable energy, reduction in greenhouse gas, rechargeable batteries, and smart grids, which have been attracting the greatest attention in the world in recent years. A fuel battery is a product which is expanding rapidly in the market in the world as a renewable energy source to replace fossil fuels without emission of pollutants. Currently, most of the energy is derived from fossil fuels, but there is a problem in that the use of such fossil fuels has serious adverse environmental impacts such as air pollution, acid rain and global warming, and low energy efficiency.

In recent years, in order to solve the problems caused by the use of such fossil fuels, interest in renewable energy and fuel cells has rapidly increased. Interests and research on such renewable energy are being actively performed not only in domestic but also worldwide.

Although the renewable energy market has entered the maturity stage both domestically and internationally, there is a problem that the amount of energy generated due to environmental influences such as time and weather is greatly changed due to the nature of renewable energy. As a result, the spread of an energy storage system (ESS) for storing regeneration energy generated for stabilization of renewable energy generation is very required, and the redox flow battery is attracting attention as such a large-capacity energy storage system.

A general structure of the redox flow battery to which the present invention is applied is configured by a stack 1 with stacked cells in which an electrochemical reaction occurs, a tank 3 for storing an electrolyte, and a pump 4 for supplying an electrolyte to the stack from the electrolyte tank.

FIG. 2 shows a simplified structure of the stack 1 to which the present invention is applied and shows an endplate 11, an insulating plate 12, a current plate 13, a bipolar plate 14, a gasket 15, a flow frame 16, an electrode 17, a gasket 15, an ion-exchange membrane 18, a gasket 15, an electrode 17, a flow frame 16, a gasket 15, a bipolar plate 14, a current plate 13, an insulating plate 12, and an endplate 11 from the left side. A unit cell is formed from the bipolar plate 14 to the bipolar plate 14, and generally, one stack is configured by stacking tens to hundreds of unit cells.

The present invention intends to manufacture an assembly for integrating a bipolar plate 14 and electrodes 17 disposed at both sides of the bipolar plate 14, and in this connection, there is U.S. Pat. No. 6,656,639 B1.

However, in U.S. Pat. No. 6,656,639 B1, since the assembly is manufactured by putting an electrode and a resin sheet (bipolar plate material) in a jig and thermally compressing them, the resin sheet at a portion which is not in contact with the electrode, is heated and at the boundary between a portion not in contact with the electrode and a portion in contact with the electrode a residual stress is generated during a cooling process, and as a result, there is a problem in that the bipolar plate is deformed or the strength thereof is weakened when the jig is separated.

SUMMARY OF THE INVENTION

The present invention has been made in an effort to manufacture a bipolar plate-electrode assembly and more particularly, to manufacture a integrated bipolar plate-electrode assembly capable of improving problems such as deforming the bipolar plate-electrode assembly or weakening the strength during cooling after thermally compressing a thermoplastic resin sheet as a bipolar plate material between electrodes.

Further, the present invention has been made in an effort to reinforce the strength by penetrating a fiber mat into a portion where the strength of the thermoplastic resin sheet may be weakened during the thermally compressing process of the electrode and the thermoplastic resin sheet.

According to an aspect of the present invention, there is provided a bipolar plate-electrode assembly for use in a redox flow battery stack, in which a bipolar plate (140) is made of a thermoplastic resin, electrodes (170A, 170B) disposed on both sides of the bipolar plate are thermally compressed at a central portion of the bipolar plate so as to be permeated into the bipolar plate, the size of the bipolar plate is larger than that of the electrodes; and fiber mats (150A, 150B) are hot-pressed so as to be permeated in a periphery (141) of the bipolar plate which is larger area than the electrodes.

A part of the fiber mats (150A; 150B) may be disposed between a periphery of the electrode and the bipolar plate and hot-pressed to be permeated into the bipolar plate (140).

The permeated fiber mat (150A; 150B) may have a shape having an inner opening, and the outer size of the fiber mat (150A, 150B) may be equal to the outer size of the bipolar plate and the size of the inner opening may be smaller than the outer size of the electrodes (170A, 170B).

According to another aspect of the present invention, there is provided a manufacturing method of a bipolar plate-electrode assembly comprising: disposing a fiber mat (150A; 150B) having an inner opening at each of both sides of a thermoplastic resin sheet as a bipolar plate (140) material; disposing an electrode material at a central portion of each of the both sides of the thermoplastic resin sheet; disposing jigs (160A; 160B) on the fiber mats (150A; 150B), respectively; and hot-pressing and cooling the outside of the jigs (160A; 160B) and the electrode material.

The order of the disposing of the electrode material and the disposing of the jig may be mutually exchangeable.

The jig (160A; 160B) may have a shape having an inner opening, the outer size of the jig (160A; 160B) may be equal to the outer size of the fiber mats (150A, 150B), the size of the inner opening may be equal to the outer size of the electrode material, and the thickness of the jig may be thinner than the thickness of the electrode.

A flow path (142) may be formed across the electrodes (170A, 170B).

A fiber mat is permeated into a thermoplastic resin sheet of a bipolar plate material that is not in contact with the electrode in the embedded bipolar-electrode bonding body to reduce warpage and deformation and improve strength, thereby manufacturing a high-quality bipolar-electrode bonding body.

Further, the fiber mat is reinforced to the inside of the edge of the electrode, thereby preventing cracking at the periphery of the electrode.

Further, the stack frame is bonded and firmly adhered, thereby preventing performance deterioration due to electrolyte leakage at the stack frame.

Further, since the resin sheet is not deteriorated, there is a stable effect against corrosion or breakage in use for a long time.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, the present invention will be described in more detail with reference to the accompanying drawings. The accompanying drawings illustrate exemplary embodiments of the present invention and are provided to explain the present invention in detail. However, the technical scope of the present invention is not limited thereto.

Figure 6:
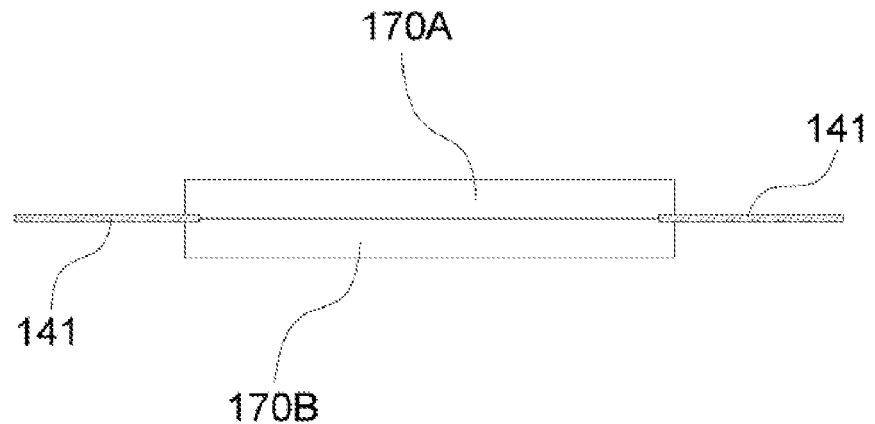

The present invention describes a manufacturing method of a bipolar plate-electrode assembly. The electrode is a place where the electrolyte passes and an electrochemical reaction occurs, and a porous conductive material is used and graphite felt 170 is preferable. In a unit cell, an anode electrode 170A and a cathode electrode 170B are intruded one by one. (However, a flow path may be formed in the anode electrode and the cathode electrode as shown in FIG. 6).

The bipolar plate 140 is a component that divides the unit cells, completely blocks the electrolyte and allows only electricity to flow therethrough and a thermoplastic resin sheet is used as the bipolar plate in the present invention. The thermoplastic resin itself is not conductive. However, the electrode is permeated into the resin during the thermocompression with the electrode and the resin has conductivity while.

Figure 1:
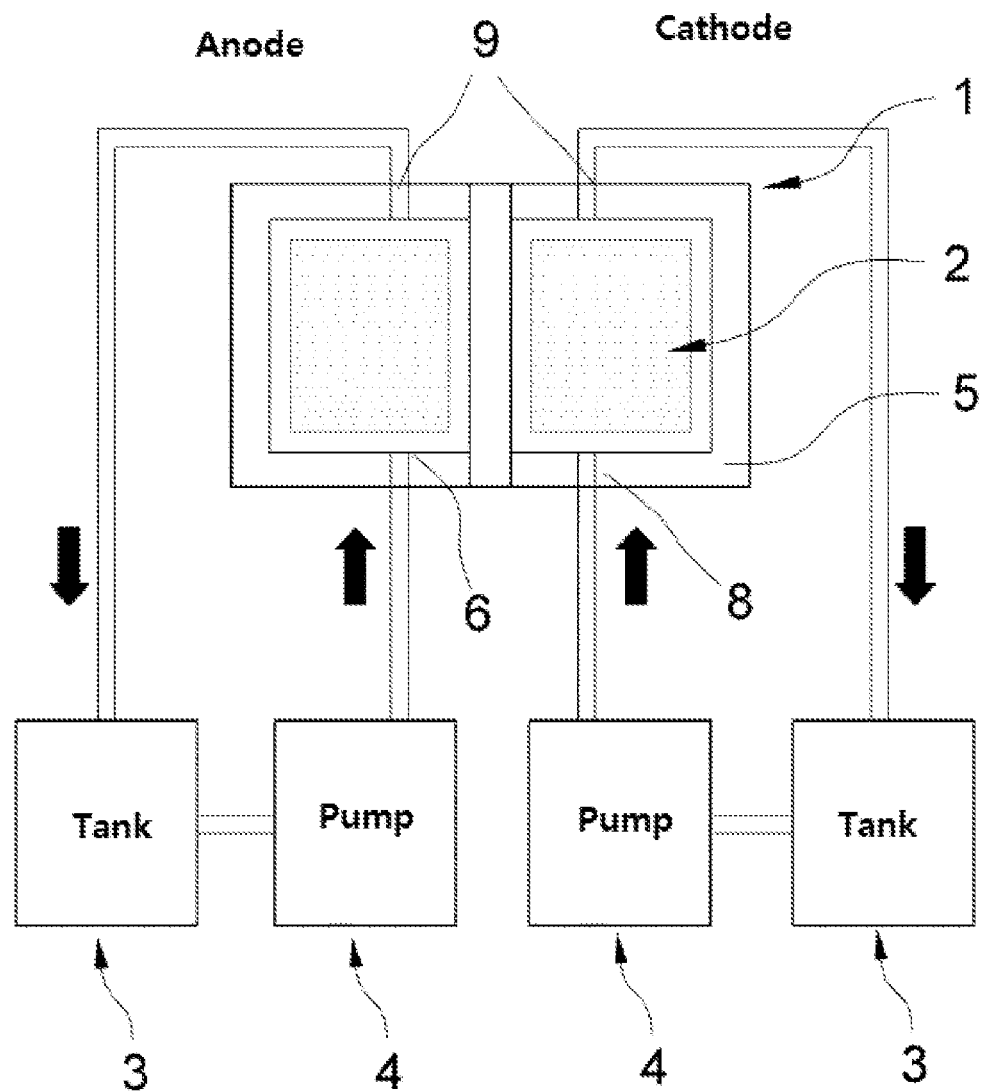
FIG. 1 is a schematic view of a redox flow battery to which the present invention is applied.
Figure 2:
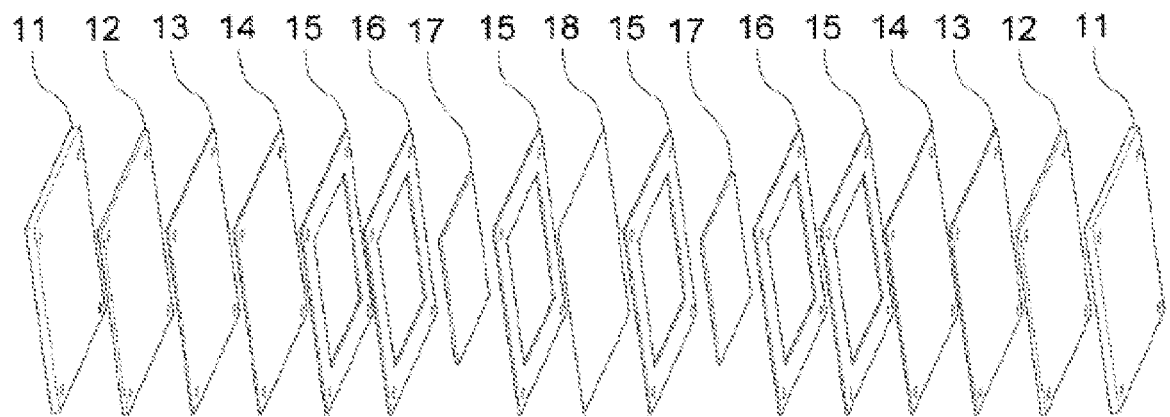
FIG. 2 is an exploded perspective view of a redox flow battery stack in the related art.
Figure 3:
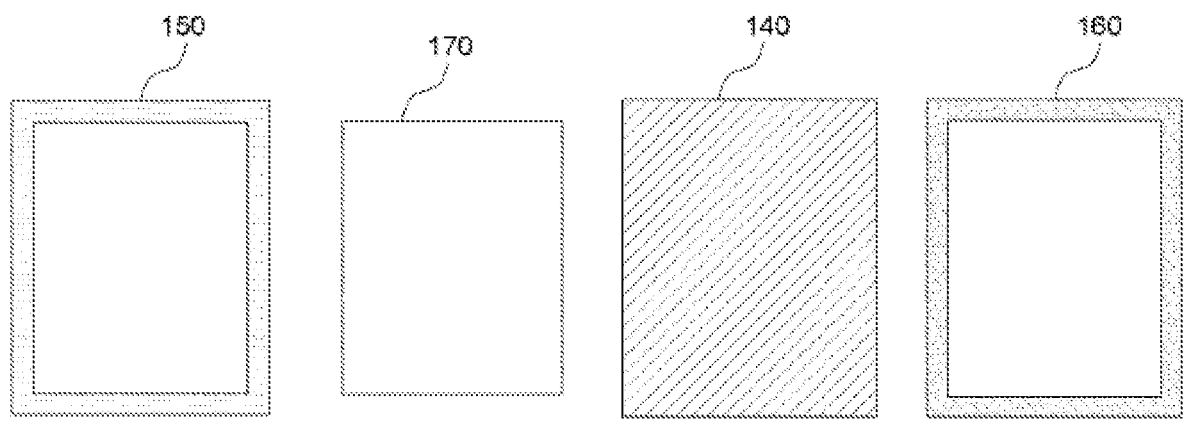
FIG. 3 is a structural element for manufacturing a bipolar plate-electrode assembly of the present invention.
Figure 7:
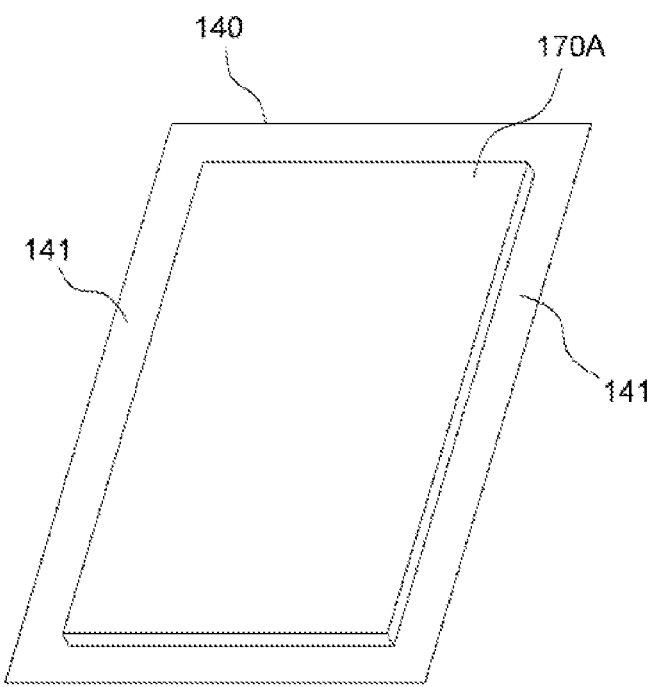
FIG. 7 is a perspective view of a bipolar plate-electrode assembly according to the present invention.

FIG. 3 shows components for manufacturing the assembly of the electrode 170 and bipolar plate of FIG. 7 as an embodiment of the present invention.

A fiber mat 150 is preferably made of an electrically conductive material such as a thin sheet made (similar material to non-woven fabric) of a fibrous material (carbon fiber, glass fiber, or the like) or carbon felt having a very thin thickness, but is not limited thereto.

However, in order for the fiber mat 150 to be applied to the redox flow battery, it is necessary to use an acid-resistant material, and the outer size of the fiber mat 150 needs to be equal to the outer size of the thermoplastic resin sheet as the material of the bipolar plate 140, and the inner opening needs to be smaller than the outer size of the electrode 170.

An assembly jig 160 compresses the fiber mat and the bipolar plate 170 which is the thermoplastic resin sheet in a hot pressing process so that the fiber is permeated into the bipolar plate, and the thickness of the assembly jig 160 is thinner than the electrode 170. The outer size of the assembly jig is equal to the outer size of the bipolar plate 140 and the inner opening is equal to the outer size of the electrode 170.

Figure 4:
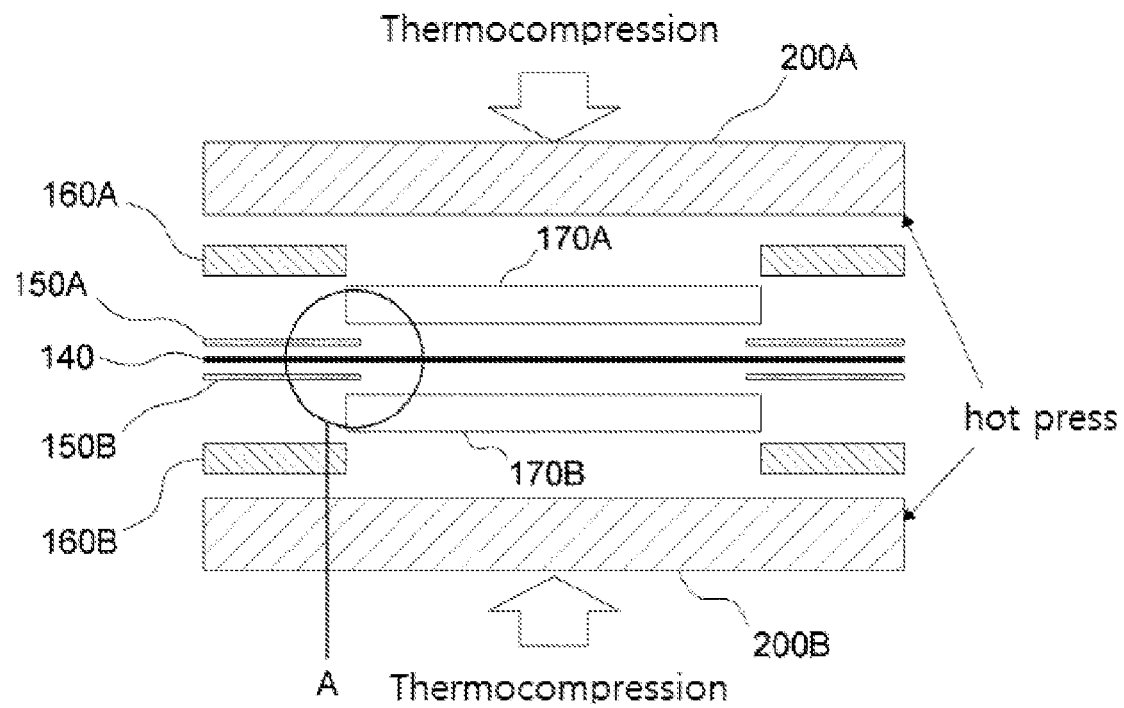
FIGS. 4 to 6 show a method of manufacturing a bipolar plate-electrode assembly of the present invention.

FIG. 4 shows a state in which the components listed in FIG. 3 are stacked between heating plates 200A and 200B. Fiber mats 150A and 150B are placed on both peripheries of the bipolar plate 140. The outer size of the fiber mat 150 is equal to the outer size of the thermoplastic resin sheet, which is the material of the bipolar plate 140, so that the fiber mat and the bipolar plate may be aligned in parallel.

Thereafter, the electrodes 170A and 170B are disposed at both central portions of the bipolar plate 140, and since the outer sizes of the electrodes 170A and 170B are larger than the inner openings of the fiber mats 150A and 150B, an overlapping portion such as a circle A is generated.

Figure 5:
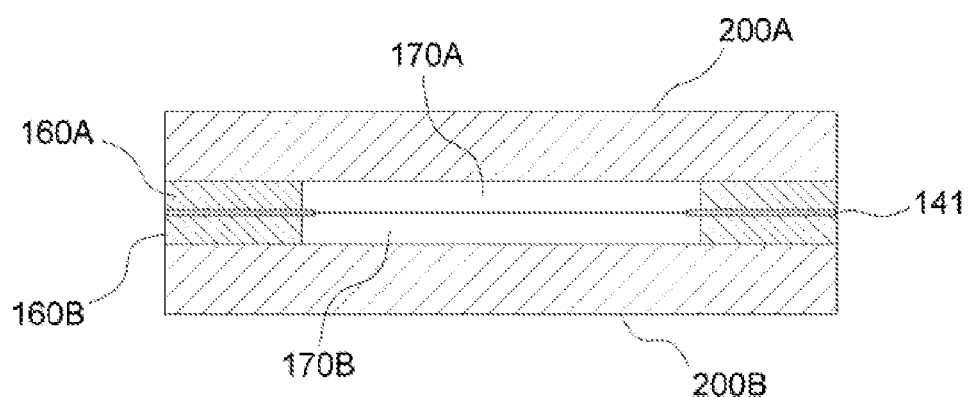

Thereafter, the jigs 160A and 160B are placed on the fiber mats 150A and 150B. The outer sizes of the jigs are equal to the outer size of the bipolar plate 140 and the inner opening is equal to the outer size of the electrodes 170A and 170B, so that the jigs 160A and 160B are placed only on the fiber mats 150A and 150B. Thereafter, when hot-pressing is performed in a state where the heating plates 200A and 200B are placed on both sides, pressed situation is generated as shown in FIG. 5.

In addition, the order of placing the electrodes 170A and 170B and the jigs 160A and 160B may be changed.

As such, when the hot-pressing is performed, the fiber mats 150A and 150B disposed on both sides of the bipolar plate 140 and the electrodes 170A and 170B are permeated into the bipolar plate to be integrated, and the bipolar plate-electrode assembly shown in FIGS. 6 and 7 is formed.

Only the fiber mat 150A and 150B are permeated into the periphery 141 of the bipolar plate 140 and the electrodes 170A and 170B are permeated into the center of the bipolar plate. The fiber mat and the electrode are simultaneously permeated into the bipolar plate at the inner portion of the electrode periphery.

In the present invention, the fiber mat 150 is applied to the periphery 141 of the bipolar plate 140 without the electrode 170 to reinforce the strength, and the electrode 170 and the fiber mat 150 are partially overlapped to prevent the periphery of the electrode 170 or the fiber mat 150 from being weakened.

The fiber mat 150 is completely permeated into the bipolar plate 140 as the resin sheet through the compression process to obtain a smooth surface at the periphery 141 and the smooth surface 141 may be attached to the adjacent flow frame 16.

Figure 8:
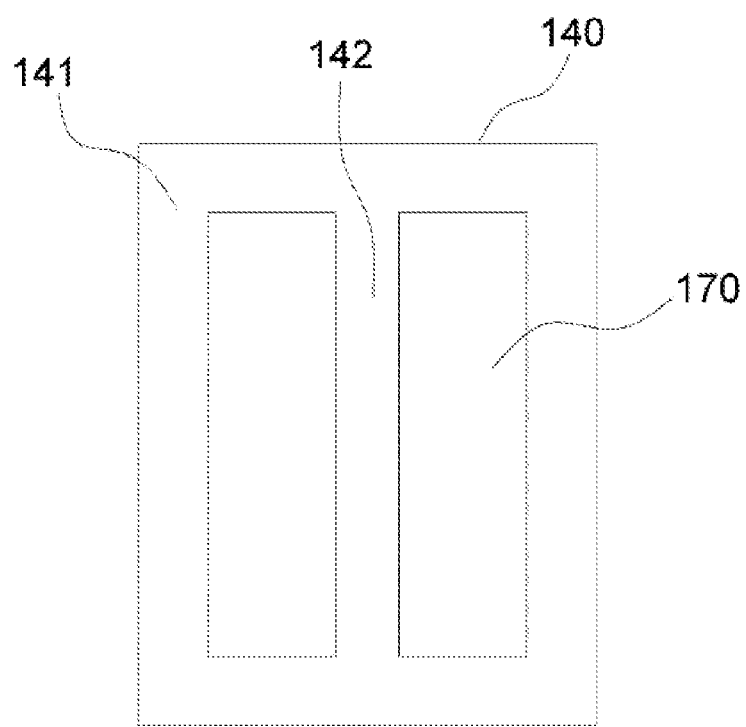
FIG. 8 is another embodiment of a bipolar plate-electrode assembly according to the present invention.

FIG. 8 shows another embodiment of the present invention in which a flow path 142 is formed through the electrode 170 on the bipolar plate 140. This allows the electrolyte to pass between two or more rectangular felt electrodes to reduce the pressure drop of the electrolyte, thereby improving system efficiency.

Figure 9:
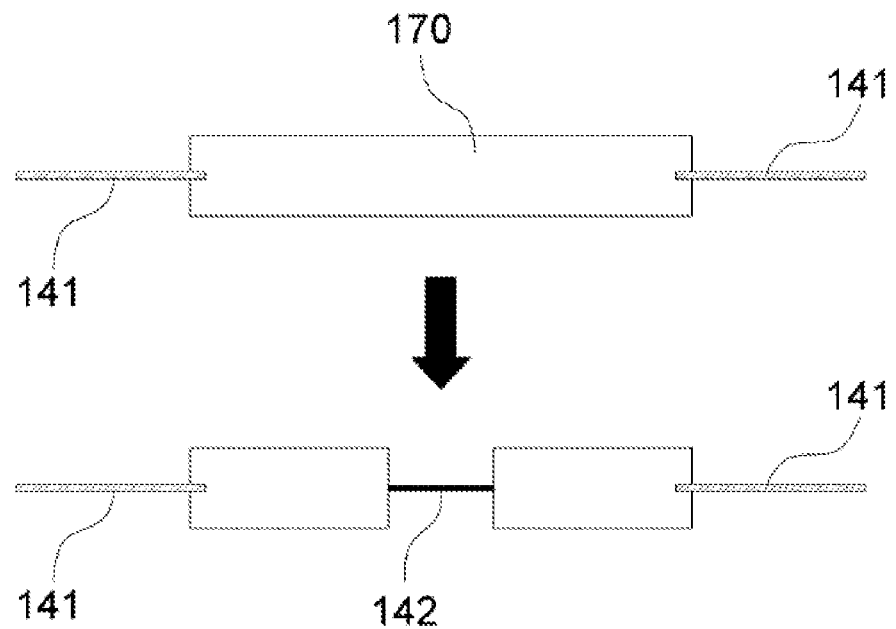
FIG. 9 shows a manufacturing method of the embodiment of FIG. 8.

The electrode-bipolar plate assembly of FIG. 8 may form a flow path at a central portion of the electrode 170 in the electrode-bipolar plate assembly manufactured in FIG. 6 using a processing tool or a graver as shown in FIG. 9. The bipolar plate felt connected to the electrode has been permeated in a dug portion (141) and the dug portion has a sufficiently high strength.

Figure 10:
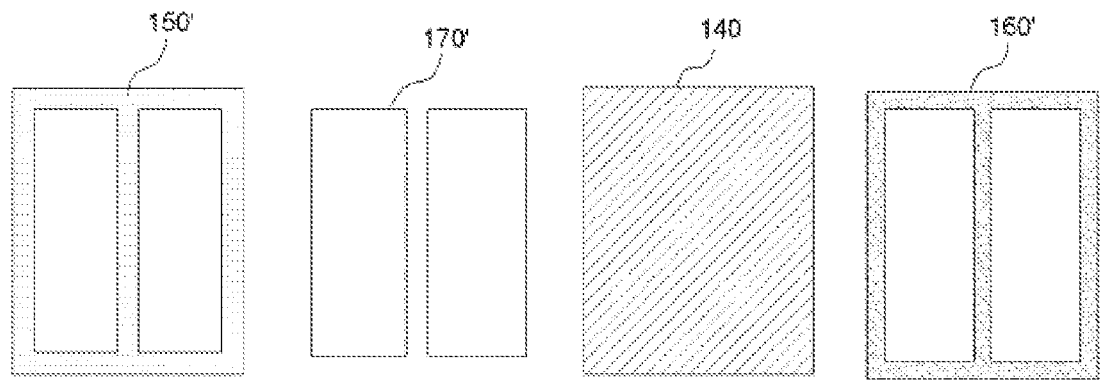
FIG. 10 shows another manufacturing method of the embodiment of FIG. 8.

The electrode-bipolar plate assembly shown in FIG. 8 may be formed by disposing a fiber mats 150' having two or more inner openings at both sides of the bipolar plate 140 as shown in FIG. 10, disposing two or more electrodes 170', and then disposing and heat-pressurizing a jig 160' having two or more inner openings.

In addition, the order of placing the electrode 170' and the jig 160' may be changed.

As a material of the electrode, graphite felt, carbon felt, carbon paper, carbon cloth, or the like may be used.

The thermoplastic resin sheet that is the material of the bipolar plate 140 may use polyethylene (PE), polypropylene (PP), polystyrene (PS), polyvinyl chloride (PVC), polycarbonate (PC), polyethylene terephthalate resin (PET), polyethylene terephthalate (PETG), polymethyl methacrylate (PMMA), and acrylonitrile butadiene styrene (ABS) sheets.

What is claimed is:

1. A bipolar plate-electrode assembly used in a redox flow battery stack, comprising:
   a bipolar plate (140) made of a thermoplastic resin,
   electrodes (170A, 170B) disposed on opposite sides of the bipolar plate, the electrodes being thermally compressed at a central portion of the bipolar plate so as to be permeated into the bipolar plate, and
   fiber mats (150A, 150B); wherein
   a size of the bipolar plate is larger than a size of the electrodes,
   the bipolar plate has a periphery (141) that is outside of the electrodes,
   the fiber mats are hot-pressed so as to be permeated into the periphery of the bipolar plate, and
   the permeated fiber mats have a shape having an inner opening, an outer size of the fiber mats is equal to an outer size of the bipolar plate, and a size of the inner opening is smaller than an outer size of the electrodes.

* * * * *